United States Patent
Fukunaga et al.

(10) Patent No.: US 8,916,125 B2
(45) Date of Patent: Dec. 23, 2014

(54) GRAPHITE MATERIAL FOR SYNTHESIZING SEMICONDUCTOR DIAMOND AND SEMICONDUCTOR DIAMOND PRODUCED BY USING THE SAME

(75) Inventors: Osamu Fukunaga, Chiba (JP); Hiroshi Okubo, Kagawa (JP); Toshiaki Sogabe, Kagawa (JP); Tetsuro Tojo, Kagawa (JP)

(73) Assignee: Toyo Tanso Co., Ltd., Osaka-shi (JP)

( * ) Notice: Subject to any disclaimer, the term of this patent is extended or adjusted under 35 U.S.C. 154(b) by 1460 days.

(21) Appl. No.: 10/499,649

(22) PCT Filed: Dec. 28, 2001

(86) PCT No.: PCT/JP01/11676
§ 371 (c)(1),
(2), (4) Date: Jun. 28, 2004

(87) PCT Pub. No.: WO03/057625
PCT Pub. Date: Jul. 17, 2003

(65) Prior Publication Data
US 2005/0032370 A1 Feb. 10, 2005

(51) Int. Cl.
*C01B 31/04* (2006.01)
*C01B 31/36* (2006.01)
*C04B 35/645* (2006.01)
*B01J 3/06* (2006.01)
*B30B 11/00* (2006.01)
*C04B 35/52* (2006.01)

(52) U.S. Cl.
CPC .............. *C04B 35/645* (2013.01); *B01J 3/062* (2013.01); *B01J 3/065* (2013.01); *B01J 3/067* (2013.01); *B30B 11/004* (2013.01); *B30B 11/007* (2013.01); *C04B 35/52* (2013.01); *C04B 35/522* (2013.01); *B01J 2203/061* (2013.01); *B01J 2203/0655* (2013.01); *C04B 2235/421* (2013.01); *C04B 2235/425* (2013.01); *C04B 2235/427* (2013.01); *C04B 2235/72* (2013.01); *C04B 2235/77* (2013.01); *C04B 2235/96* (2013.01); *C04B 2235/9607* (2013.01)
USPC .......................................... 423/448; 423/291

(58) Field of Classification Search
USPC ......................................... 423/446, 448, 291
See application file for complete search history.

(56) References Cited

U.S. PATENT DOCUMENTS 3,676,069 A    7/1972 Kennedy
4,518,702 A  * 5/1985 Yoshida et al. ................. 501/90
(Continued)

FOREIGN PATENT DOCUMENTS

EP    0 647 590 A2    4/1995
EP    0 894 766 A1    2/1999
(Continued)

OTHER PUBLICATIONS

Williams, et al., Impurity conduction in synthetic semiconducting diamond, 3 J. Phys. C: Solid St. Phys., 1727 (1970).*
(Continued)

*Primary Examiner* — Daniel C McCracken
(74) *Attorney, Agent, or Firm* — Oblon, Spivak, McClelland, Maier & Neustadt, L.L.P.

(57) ABSTRACT

A method for producing a semiconductor diamond containing boron by the high pressure synthesis method, wherein a graphite material to be converted to the semiconductor diamond is mixed with boron or a boron compound, formed and fired, in such a way that the resultant graphite material contains a boron component uniformly dispersed therein and has an enhanced bulk density, a high purity and a reduced content of hydrogen.

8 Claims, 2 Drawing Sheets

90° polarization (100 magnifications)

(56) References Cited

U.S. PATENT DOCUMENTS

| | | | |
|---|---|---|---|
| 5,266,236 A * | 11/1993 | Bovenkerk | 252/503 |
| 5,541,423 A * | 7/1996 | Hirabayashi | 257/77 |
| 5,776,323 A * | 7/1998 | Kobashi | 204/294 |
| 5,792,256 A * | 8/1998 | Kucherov et al. | 117/89 |
| 6,030,595 A | 2/2000 | Sumiya et al. | |
| 6,342,195 B1 | 1/2002 | Roy et al. | |
| 2001/0001385 A1 | 5/2001 | Nakamura et al. | |

FOREIGN PATENT DOCUMENTS

| | | |
|---|---|---|
| JP | 59-6808 | 2/1984 |
| JP | 59-137396 | 8/1984 |
| JP | 2-155226 | 6/1990 |
| JP | 4-266020 | 9/1992 |
| JP | 5-152604 | 6/1993 |
| JP | 5-229896 | 9/1993 |
| JP | 9-13188 | 1/1997 |
| JP | 10-81588 | 3/1998 |
| JP | 10-236898 | 9/1998 |
| JP | 11-207167 | 8/1999 |
| JP | 2001-170474 | 6/2001 |
| JP | 2002-018267 | 1/2002 |
| JP | 2002-18267 | 1/2002 |

OTHER PUBLICATIONS

Duward Shriver & Peter Atkins, Inorganic Chemistry p. 352 (3d ed., W.H. Freeman and Company, 1999).*
Hagio, et al., Studies on X-ray Diffraction and Raman Spectra of B-Doped Natural Graphite, Carbon 1989; 27(2): 259-263.*
Perry's Chemical Engineers Handbook p. 2-12 (Don W. Green ed., 7th ed., McGraw-Hill 1997).*
Geis, et al., High-Temperature Point-Contact Transistors and Schottky Diodes Formed on Synthetic Boron-Doped Diamond, IEEE Electron Device Letters 1987; EDL-8, No. 8: 341-343.*
Dahn, et al., Mechanisms for Lithium Insertion in Carbonaceous Materials, Science 1995; 270: 590-593.*
Patent Abstracts of Japan, JP 07-148426, Jun. 13, 1995.
Patent Abstracts of Japan, JP 63-158126, Jul. 1, 1988.
International Search Report issued Mar. 19, 2002 in corresponding International Application No. PCT/JP/01/11676, filed Dec. 28, 2011.
Sosngshun Wang, "The effect of the graphite containing trace boron element on the synthesis of diamond", Kexue Tongbao, vol. 28, No. 7, pp. 985-988. (1983).
Manabu Miyamoto, et al. "Glassjo tanso kara no harijo diamond gosei", R&D Kobe Steel Engineering Reports, vol. 40, No. 4, pp. 44-47. (Oct. 1, 1990).

* cited by examiner

90° polarization (100 magnifications)

90° polarization (100 magnifications)

GRAPHITE MATERIAL FOR SYNTHESIZING SEMICONDUCTOR DIAMOND AND SEMICONDUCTOR DIAMOND PRODUCED BY USING THE SAME

TECHNICAL FIELD

The present invention relates to purified graphite material inventive embodiments used for synthesizing semiconductor diamonds. The semiconductor diamonds contain a large amount of boron, and are made by high pressure synthesis. The present invention also relates to semiconductor diamond inventive embodiments produced by using the purified graphite material inventive embodiments.

BACKGROUND ART

High pressure synthesis is widely used for producing industrial diamonds. It is known that an industrial diamond containing boron can be synthesized by adding boron into a catalytic metal or the like when the diamond is produced by high pressure synthesis. It is also known that a boron atom substitutes for a carbon atom to make an acceptor level in the upper part of a valence band, i.e., at 0.37 eV, thereby making a p-type semiconductor.

Recently, diamonds containing boron, because of their above-described semiconductor characteristics, have been considered for use in various electrodes, chemical resistance sensors, conductive grinding stones, etc.,. These possible new areas of use have resulted in an increased demand for semiconductor diamonds containing boron The increased demand for semiconductor diamonds containing boron requires that the diamonds be synthesized with high efficiency and at a high yield.

In a conventional high pressure synthesis method, for example, in a method disclosed in Japanese Patent Publication No. 59-6808, boron is added together with aluminum into a catalyst metal that acts as a catalyst during diamond synthesis. The metal is employed catalytically, in molten form, to make a diamond single crystal grow on a diamond seed crystal. The quantity of boron added in the catalyst is controlled as best as possible, thereby, to the extant possible, controlling the boron content in the synthesized diamond.

In the above-described method it is difficult to control the quantity of boron added in the molten metal catalyst. In addition, it is difficult to uniformly distribute boron in the resultant diamond. Finally, diamond yields are not high.

Because of the many drawbacks in the above-described representative process, an object of the present invention is to provide purified graphite material inventive embodiments, for synthesizing semiconductor diamonds. The purified graphite material inventive embodiments, ideally, allow the production of boron or boron compound containing semiconductor diamonds inventive embodiments to be achieved at high yield. The purified graphite material inventive embodiments also allow the boron or a boron compound to be contained in the diamond inventive embodiments at a high percentage, and allow a uniform distribution of the boron or boron compound in the diamonds.

DISCLOSURE OF THE INVENTION

The present inventors have found that the conversion rate of a graphite material into a diamond can be remarkably improved by uniformly adding boron or a boron compound in the graphite material, and compacting and purifying the graphite material into a purified graphite material, thereby reducing its hydrogen content.

An embodiment of a purified graphite material of the present invention is characterized in that the graphite material contains boron or a boron compound. The content of boron in the purified graphite material is preferably 0.1 to 15 mass %, more preferably, 0.5 to 10 mass %. The bulk density of the purified graphite material is preferably not less than 1.6 g/cm$^3$, more preferably, not less than 1.7 g/cm$^3$. The hydrogen content in the purified graphite material is preferably not more than 1000 ppm, more preferably, not more than 500 ppm, still more preferably, not more than 50 ppm.

BEST FORM FOR CARRYING OUT THE INVENTION

Figure 1:
FIG. 1 is a polarization microscope photograph of a purified graphite material of Example 1.

Boron powder or boron carbide powder, artificial graphite powder, and soft carbon powder are used as raw materials for a purified graphite material of the present invention. To make a purified graphite material of the present invention, these raw materials are blended, formed, baked, graphitized, and purified by arbitrary methods.

The boron powder or boron carbide powder is not particularly limited and commercially available boron powders or boron carbide powders can be employed. The mean particle diameter of the boron powder or boron carbide powder is preferably not more than 50 micrometer. If the mean particle diameter exceeds 50 micrometer, the boron ingredient may be biased in the graphite material after being baked and graphitized.

Soft carbon powders employable to make the graphite powder of the present invention include petroleum coke, pitch coke, coal coke, etc. Of these, mesophase spherules, that are produced by thermal treatment of pitches, are preferable because they have self-sinterability and can be baked without using a binder or binder equivalent. The mean particle diameter of the soft carbon powder is preferably not more than 50 micrometer. By regulating the mean particle diameter to not more than 50 micrometer, the above-described boron or boron carbide powder can be uniformly mixed without being biased.

Also, the mean particle diameter of the artificial graphite powder is preferably not more than 50 micrometer. By regulating the mean particle diameters of the raw materials to substantially the same degree, the respective raw materials can be uniformly mixed without being biased.

After collecting the powders, 0.1 to 15 mass %, preferably, 0.2 to 10 mass %, of the boron powder or boron carbide powder, 76 to 98.9 mass %, preferably, 81 to 98.8 mass %, of the soft carbon powder, and 1 to 9 mass % of the artificial graphite powder are blended for one to two hours by an arbitrary method. The resulting powder blend is then formed by an arbitrary forming method, such as cold isostatic pressing, into an arbitrary shape and size. Afterward, the formed powder blend is baked under a non-oxidizing atmosphere at a temperature of 600 to 1300 degrees C. (this baking is hereinafter called a primary baking). After the primary baking, the resultant product is baked in an inert gas atmosphere at a temperature of 1800 to 2200 degrees C., preferably, at 2000 degrees C. (this baking is herein after called a secondary baking). The material resulting from the secondary baking is one purified graphite material embodiment of the present invention.

Next, thermal treatment at a temperature of 2400 to 2600 degrees C. is performed under a non-oxidizing atmosphere to enhance the degree of graphitization and sublimate impurities. A purified graphite material, that is another purified graphite material embodiment of the present invention, is thus obtained. The hydrogen content of this purified graphite material can be not more than 1000 ppm. In addition, by enhancing the degree of graphitization, the conversion rate into a diamond can be further improved.

The secondary baking is thought to allow the boron ingredients to be very uniformly dispersed. Also, evaporative loss of the boron ingredients is almost completely supressed.

Thus, by employing the above-described process, with or without thermal treatment, a purified graphite material containing boron is obtained in which important physical properties, such as machinability, thermal conductivity, and coefficient of thermal expansion, have been improved.

Without being bound by theory, it is thought that many of the properties of the purified graphite material result from heating in excess of the temperature limit for stable existence of boron. The graphitization reaction of carbon is also though to be progressed by high temperature baking.

In addition, and without being bound by theory, it is possible that the high temperature baking causes a change in the boron-containing graphite material such that the graphite material behaves as if it were a solution. This solution-like behavior allows the boron to become uniformly dispersed therein and in an aggregate of the graphite crystals, carbon is partially replaced by boron.

By such a treatment, the bulk density is not less than 1.6 g/cm$^3$, preferably, not less than 1.7 g/cm$^3$, and a purified graphite material in which boron is uniformly dispersed can be obtained.

In addition, the content of boron elements in the purified graphite material can be 0.1 to 15 mass %, preferably, 0.2 to 10 mass %. If the bulk density is less than 1.6 g/cm$^3$, it is undesirable because the conversion rate into a diamond becomes bad. The content of boron elements in the purified graphite material can be controlled to the range of 0.1 to 15 mass %, preferably, 0.2 to 10 mass % by controlling the quantity of the boron or boron carbide powder to be added as a raw material.

If the content of boron elements is less than 0.1 mass %, the diamond converted from the purified graphite may not exhibit noticeable semiconductor characteristics. On the other hand, if the content exceeds 15 mass %, undesirably, boron carbide may deposit.

Further purifying can be performed in order to reduce impurity contents such as hydrogen in the graphite material. By this, the yield of diamond is further improved. If the purified graphite material contains impurities such as moisture, hydrogen, oxygen, and sulfur, in particular, if the purified graphite material contains even a little hydrogen, the yield of conversion of the graphite material into diamond is extremely reduced. For this reason, the graphite material having been graphitized at the above-described high temperature can be thermally treated under a pressure of not more than 0.1 Pa, preferably, not more than 0.01 Pa, at a temperature of not less than 1800 degrees C. for not less than two hours. By this treatment, impurities such as moisture, hydrogen, oxygen, and sulfur in the graphite material, and in particular hydrogen, are reduced, the hydrogen content can be 1000 ppm, preferably, 500 ppm, more preferably 50 ppm. The hydrogen content was measured with a carbon/hydrogen/moisture analyzer (RH-IE type made by LECO Corporation).

By employing a purified graphite material of the invention for diamond synthesis, the conversion rate of the purified graphite material into a semiconductor diamond containing boron is improved as compared to the prior art.

By using the graphite material thus obtained, a semiconductor diamond can be industrially produced, and application to various electrodes, chemical resistance sensors, conductive grinding stones, etc., also becomes possible.

Hereinafter, the present invention will be described more specifically with reference to examples.

Example 1

Raw materials were assembled in a ratio of:
15 mass % of boron carbide powder with a mean particle diameter of 13 micrometer;
80 mass % of mesophase spherules having a mean particle diameter of 11 micrometer; and
5 mass % of artificial graphite powder having a mean particle diameter of 4 micrometer.

The powders were dry blended for one hour at the ordinary temperature and then pressed into a form by cold isostatic pressing, conducted at 80 MPa, to obtain a molded component with dimensions of 120×520×720 mm.

The molded component was packed in coke powder and the temperature of the molded component was raised to 1000 degrees C. under a non-oxidizing atmosphere to obtain a primary-sintered sample.

This primary-sintered sample was then buried in coke powder within a resistance heating furnace and thermally treated at 2000 degrees C. in an inert gas atmosphere.

Further, it was thermally treated at 2400 degrees C. in an Acheson furnace to improve the degree of graphitization and uniformize the dispersion of boron in the graphite material.

This graphite material had a bulk density of 1.8 g/cm$^3$, a Shore hardness of 12, a resistivity of 9 microohm meter, a bending strength of 60 MPa, a compressive strength of 65 MPa, an elastic modulus of 3 GPa, a boron element content of 10 mass %, a thermal expansion coefficient of $2\times10^{-6}$/degree C, a thermal conductivity of 40 W/(meter degree C.), and a hydrogen content of 300 ppm.

Comparative Example 1

A graphite material was made in the same manner as in Example 1. However, the thermal treatment at 2400 degrees C. in the Acheson furnace was not performed. This graphite material had a bulk density of 1.8 g/cm$^3$, a Shore hardness of 70, a resistivity of 15 microohm meter, a bending strength of 60 MPa, a compressive strength of 140 MPa, an elastic modulus of 22 GPa, a boron element content of 10 mass %, a thermal expansion coefficient of $5\times10^{-6}$/degree C, a thermal conductivity of 30 W/(meter degree C.), and a hydrogen content of not less than 1000 ppm.

Example 2

The graphite material of Comparative Example 1 was thermally treated at 2150 degrees C. under a pressure of $1.5\times10^{-3}$ Pa. This graphite material had a bulk density of 1.8 g/cm$^3$, a Shore hardness of 70, its resistivity of 11 microohm meter, a bending strength of 70 MPa, a compressive strength of 150 MPa, an elastic modulus of 20 GPa, a boron element content of 10 mass %, a thermal expansion coefficient of $5 \times 10^{-6}$/degree C, a thermal conductivity of 35 W/(meter degree C.), and a hydrogen content of about 150 ppm.

Figure 2:
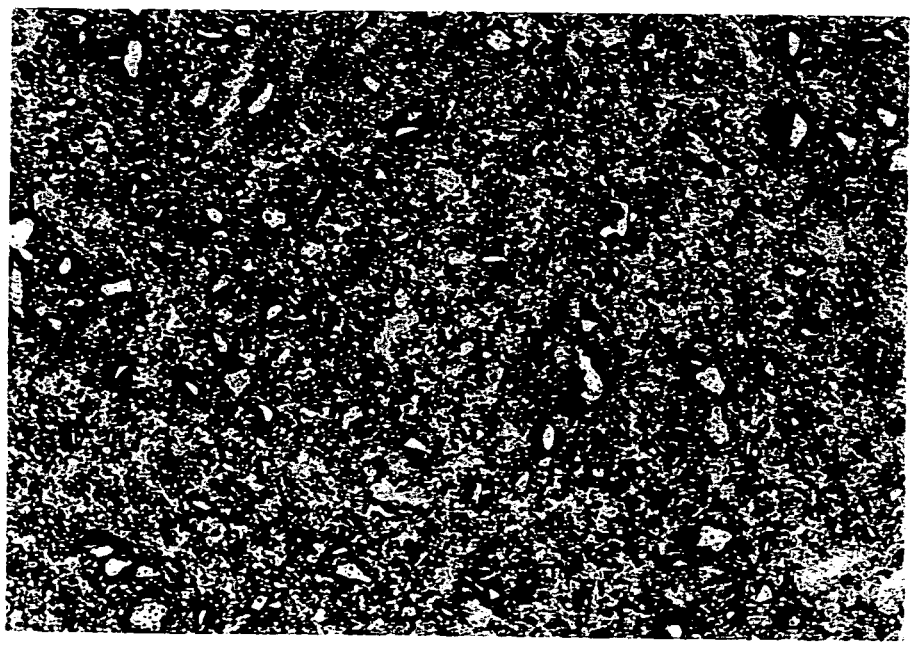
FIG. 2 is a polarization microscope photograph of a comparative graphite material of Comparative Example 1

FIGS. 1 and 2 show polarization microscope photographs of the graphite materials of Example 1 and Comparative Example 1, respectively. From these FIGS. 1 and 2, it is confirmed that the graphite material of Example 1 is higher in the degree of graphitization than the graphite material of Comparative Example 2.

Figure 3:
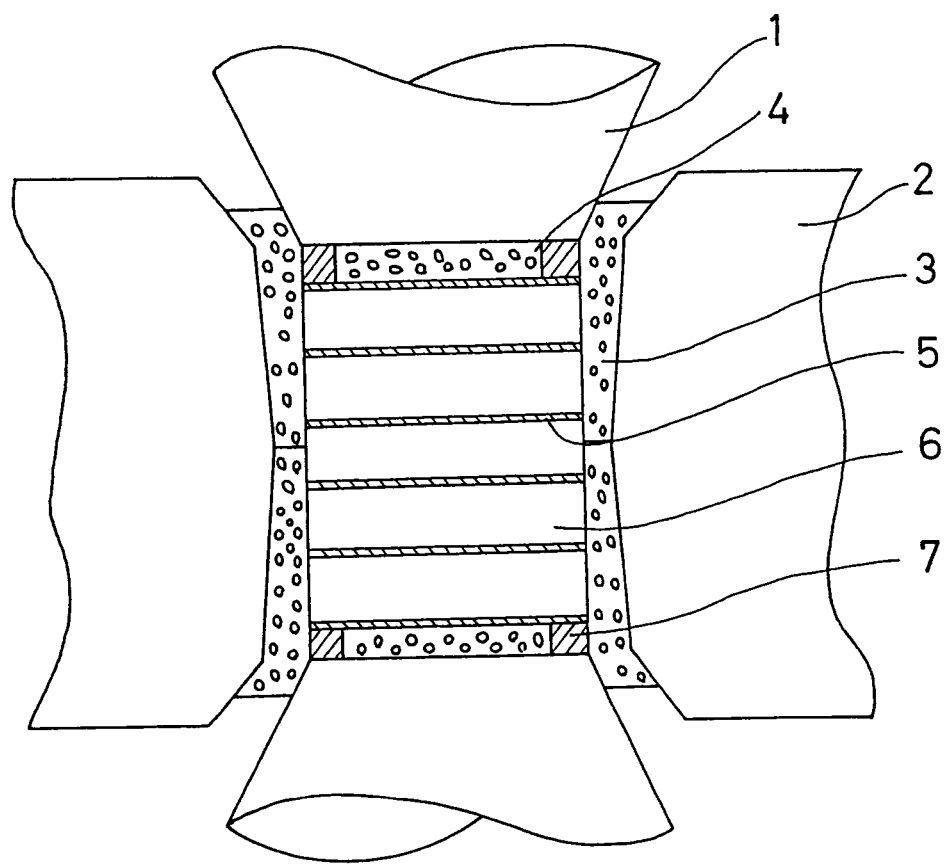
FIG. 3 is a sectional view of a sample cell. The sample cell is used in a belt type super high pressure diamond synthesis apparatus. A purified graphite material according to the present invention is converted into a diamond by the belt type super high pressure diamond synthesis apparatus.

Next, the respective graphite materials of Example 1, Comparative Example 1, and Example 2 were processed into phi 15 mm×3 mm and then converted into diamonds using a belt type super high pressure apparatus. FIG. 3 shows a sectional view of a sample cell used in the belt type super high pressure apparatus. In FIG. 3, reference numeral 1 denotes an anvil; reference numeral 2 denotes a cylinder; reference numeral 3 denotes a pyroferrite gasket; reference numeral 4 denotes an isolating plate of a molded component made of salt in which 10% of zirconia powder has been mixed; reference numeral 5 denotes a catalytic metal plate; reference numeral 6 denotes a graphite material according to the present invention; and reference numeral 7 denotes a graphite ring to be electrified to function as a heater.

To synthesize a diamond, as shown in FIG. 3, the graphite material 6 and the catalytic metal plate 5 were alternately put in layers in a not-shown tube of the same material as the isolating plate 4. The rings 7 disposed in the upper and lower portions of the tube were electrified and a temperature of 1400 degrees C. and a pressure of about 5.5 GPa were kept for 30 minutes.

Afterward, the electrification to the rings 7 was reduced to cool to the room temperature and then the pressure was gradually lowered and a sample was taken out. After the sample was treated with hydrochloric acid and nitric acid, a diamond was obtained. The obtained diamond contained boron and exhibited semiconductor characteristics.

In case of using the graphite material of Example 1, the mean particle diameter of the obtained diamond was 25 micrometer and the conversion yield from the graphite material 6 into the diamond was 97%. In case of using the graphite material of Comparative Example 1, the mean particle diameter of the obtained diamond was 25 micrometer and the conversion yield into the diamond was not more than 17%. In case of using the graphite material of Example 2, the mean particle diameter of the obtained diamond was 20 micrometer and the conversion yield into the diamond was not less than 99%. Here, the conversion yield was calculated from the measured weights of the starting graphite raw material and the product synthesized diamond.

As described above, by both enhancing the degree of graphitization, and reducing the hydrogen content, in the graphite material, the yield of a diamond synthesized from the graphite material is remarkably improved.

INDUSTRIAL APPLICABILITY

The conversion rate of a graphite material into a diamond can be remarkably improved by uniformly adding boron or a boron compound in the graphite material and compacting and purifying the graphite material to reduce its hydrogen content. This makes it possible to industrially produce semiconductor diamonds, and application to various electrodes, chemical resistance sensors, conductive grinding stones, etc., also becomes possible.

The invention claimed is:

1. A graphite material used for producing a semiconductor diamond, comprising:
    a sintered mixture of graphite and at least one of boron and a boron compound,
    wherein the graphite material comprises hydrogen impurities in an amount of not more than 300 ppm, and
    wherein the bulk density of the graphite material is 1.6 g/cm$^3$ or greater.

2. The graphite material used for producing a semiconductor diamond of claim 1, wherein the boron element content of the graphite material is 0.1 mass % to 15 mass %.

3. The graphite material used for producing a semiconductor diamond of claim 1, wherein the boron is present in the graphite material in an amount of from 0.5 to 10 mass %.

4. The graphite material used for producing a semiconductor diamond of claim 1, having a bulk density of 1.7 g/cm$^3$ or greater.

5. The graphite material used for producing a semiconductor diamond of claim 1, wherein the graphite and the at least one of boron and a boron compound have a mean particle diameter of not more than 50 micrometers.

6. The graphite material used for producing a semiconductor diamond of claim 1, comprising boron uniformly dispersed in the graphite material.

7. A method for producing the graphite material of claim 1, comprising
    blending a soft carbon powder with a boron powder or a boron carbide powder and an artificial graphite powder to form a powder blend,
    baking the powder blend at a temperature of 600° C. to 1300° C. under a non-oxidizing atmosphere to form a first baked powder blend, and
    baking the first baked powder blend at a temperature of 1800° C. to 2200° C. under an inert atmosphere to form the graphite material.

8. The method of claim 7, wherein the method further comprises:
    after baking the first powder blend at a temperature of 1800° C. to 2200° C. under an inert atmosphere, thermally treating the resultant product at 2400 to 2600° C.

* * * * *